US00RE44360E

(19) United States
(12) Reissued Patent
Kim

(10) Patent Number: US RE44,360 E
(45) Date of Reissued Patent: Jul. 9, 2013

(54) VIBRATORY APPARATUS OF EXERCISE

(76) Inventor: Seong Bae Kim, Seoul (KR)

(21) Appl. No.: 12/324,414

(22) Filed: Nov. 26, 2008

Related U.S. Patent Documents

Reissue of:
(64) Patent No.: 7,141,029
Issued: Nov. 28, 2006
Appl. No.: 11/261,710
Filed: Oct. 31, 2005

(30) Foreign Application Priority Data

Oct. 29, 2004 (KR) ..... 10-2004-0087126

(51) Int. Cl.
*A61H 1/00* (2006.01)

(52) U.S. Cl.
USPC ..... 601/78; 601/23; 601/30; 601/49; 482/148

(58) Field of Classification Search
USPC 601/24, 26–30, 46, 49, 66, 78, 79–83; 482/2, 482/903
See application file for complete search history.

(56) References Cited

U.S. PATENT DOCUMENTS 2,768,621 A * 10/1956 Wahl ..... 601/79
3,830,099 A 8/1974 Ichikawa
4,005,703 A * 2/1977 Rosen et al. ..... 601/57
4,439,700 A 3/1984 Menzel et al.
4,446,855 A * 5/1984 Friedson ..... 601/15
4,697,581 A * 10/1987 Endo et al. ..... 601/78
4,788,968 A 12/1988 Rudashevsky et al.
5,188,095 A * 2/1993 Healy ..... 601/61
5,442,710 A * 8/1995 Komatsu ..... 381/162
5,693,990 A 12/1997 Miyazaki
6,665,414 B1 12/2003 Murayama et al.
7,361,152 B2 * 4/2008 Sanada et al. ..... 601/46
2002/0092558 A1 7/2002 Kim et al.
2004/0127374 A1 7/2004 Jo et al.
2005/0048397 A1 3/2005 Jo et al.
2005/0065724 A1 3/2005 Lee et al.
2006/0093180 A1 5/2006 Kim
2008/0275373 A1 11/2008 van der Meer

FOREIGN PATENT DOCUMENTS

JP 06007408 A * 1/1994

* cited by examiner

*Primary Examiner* — Glenn Richman
(74) *Attorney, Agent, or Firm* — Wells St. John PS

(57) ABSTRACT

A vibratory exercise apparatus capable of providing sufficient vertical movement force is provided that adopts a structure of a bobbin coil connected with a vibration plate employed in a magnetic gap of a magnetic circuit using a permanent magnet that can generate a strong magnetic force, thereby providing sufficient vertical movement force to the vibration plate for vibratory exercise.

30 Claims, 5 Drawing Sheets

VIBRATORY APPARATUS OF EXERCISE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a vibratory exercise apparatus, and more particularly, to a vibratory exercise apparatus which adopts the structure of employing a bobbin coil connected with a vibration plate in a magnetic gap of a magnetic circuit using a double permanent magnet that can generate a strong magnetic force, to thereby provide a sufficient vertical movement force.

2. Description of the Related Art

In general, high-calorie foods are recently affluent. Thus, if people have not worried about becoming fat, they are apt to catch a disease called obesity. It is well known that obesity has a relation with adult disorders such as heart disease, high blood pressure, and diabetes. In the field of orthopedic surgery, doctors are interested in obesity since it is known that obesity is involved with bone arthritis.

Excessive overweight is a burden to movement of a joint, and accordingly causes the joint to be damaged. A variety of treatments have been developed and are currently available in order to cure obesity.

The best cure for obesity is a controlled meal and proper exercise. It has been known that it is desirable to reduce body fat through diet by taking proper nutrients and calories, aerobic exercise that burns fat in the blood, and muscle strengthening exercise.

In the case that a person tries to reduce his or her weight abruptly within a short period of time, health may get worse due to various types of side effects such as constipation, diarrhea, low blood pressure, dehydration, liver function trouble, lowering of immune activities, heart arrhythmia, and protein imbalance.

Thus, in order to cure obesity safely while avoiding a yo-yo phenomenon, it is necessary to take a general and persistent treatment through diet, exercise and medicinal therapy. Aerobic exercise, such as a walking, jogging, swimming, and badminton play, is good to reduce fat.

Here, abdominal obesity is considered to exist in the case that a man's girth is over 90 cm, that is, 35 inches, and a woman's girth is over 80 cm, that is 31 inches. Most adults over forty suffering from abdominal obesity had a normal weight or a low weight at a growing period but gain weight in adult times. Although a normal weight is maintained, abdominal obesity has a physical feature in which fat is accumulated in the abdomen.

In particular, abdominal fatness has a tendency of abruptly increasing obesity in children due to a recent high calorie food life culture, and processing of long-time business affairs and playing games using computers. In this case, adults can cure obesity at their will through a controlled meal and proper exercise, but it is difficult to apply the adult's obesity cure method to kids to solve kid's fatness. That is, an exercise instrument capable of effectively making an exercise while avoiding an excessive exercise, is being highly needed.

In particular, in the case of serious obesity, walking or jogging may have a bad effect upon the joints of the knee. Accordingly, people who suffer from serious obesity have tendencies of avoiding walking or jogging. As a result, people who suffer from serious obesity use an abdominal vibration belt as a low impact exercise as well as an aerobic exercise, or use a running machine that operates at a low speed.

A vertical movement vibrator has been proposed a whole body exercise instrument that helps a user to perform aerobic exercise and does not give a burden to the articulation of a ligament, a tendon, etc., A vibrator using a rotating motor is known as a conventional vertical movement instrument. Such a rotating type vertical movement instrument applies vibration only to the abdominal region according to establishment of a proper frequency, to thereby make a user conveniently perform an aerobic exercise. Therefore, the vertical movement instrument is medically used to provide aerobic exercise to patients suffering from serious obesity or abdominal obesity.

However, the conventional vertical movement instrument includes an eccentric weight provided on a rotational shaft of a rotating motor, and vibrates a support plate up and down while rotating. Accordingly, partial wear of bearings becomes severe due to eccentricity, causing structural problems that deteriorate durability is and produce a great deal of noise.

Also, the rotating-type vertical movement instrument produces a weak intensity vibration, for example, under a low frequency of 20 Hz or less, to thus provide little vibration effect. Also, the rotating-type vertical movement instrument produces vibration left and right, or does not perform an accurate vertical movement but a deviated vertical movement, to accordingly give a burden to an articulation of the human body.

Further, the rotating-type vertical movement instrument uses a rotating motor, and thus has difficulty in accurately controlling the number of vibrations and providing a sufficient vibration force with respect to a vibration plate.

Meanwhile, a conventional vibrator for generating vibration corresponding to an audio signal using a magnetic circuit of a speaker employing a permanent magnet has been proposed. The conventional vibrator is appropriate for making a user feel vibration stereophonically through a user's hand or body in correspondence to an audio signal. However, the conventional vibrator lacks a magnetic force for driving a vibration plate for aerobic exercise. Therefore, the conventional vibrator is not appropriate for a vibration plate driving mechanism for aerobic exercise since the magnetic force of a direct-current (DC) magnetic field using a permanent magnet has a limited magnitude of 5000 Gauss at a maximum.

To solve the above problems, a vibrator using an electric magnet instead of a permanent magnet was proposed, but the production cost of the vibrator increases due to manufacturing of an electric magnet.

Also, an increase in power consumption for driving an electric magnet gives users an economical burden. Further, since large electric power is needed to obtain a sufficient force with the use of the electric magnet, high temperature heat is generated. Accordingly, a separate complicated facility is needed to radiate the high temperature heat.

Also, an increase in a power consumption for driving an electric magnet causes to give users an economical burden. Further, since a large electric power is needed to obtain a sufficient force by use of the electric magnet, high temperature heat is generated. Accordingly, a separate complicated facility is needed to radiate the high temperature heat, to accordingly lower productivity.

SUMMARY OF THE INVENTION

To solve the above problems, it is an object of the present invention to provide a vibratory exercise apparatus employing a vertical vibrator made of a magnetic circuit including a dual magnet of a high-power, high-efficiency characteristic, in which first and second magnetic circuits are formed of Neodymium magnets as an F-type magnet where a magnet is located externally in a magnetic circuit and a P-type magnet where a magnet is located internally in a magnetic circuit, in order to increase a magnetic flux density of a magnetic gap and simultaneously a leakage magnetic flux is suppressed from being generated from the magnetic gap by the second magnetic circuit.

It is another object of the present invention to provide a vibratory exercise apparatus employing a high-power magnetic circuit having a high-efficiency, low-distortion frequency characteristic, in which a linear response characteristic of a vibration system is improved by realizing a uniform distribution of the line of a magnetic force on yoke opposing surfaces forming a magnetic gap in a second magnetic circuit including a P-type magnet, an opposing portion between two yokes forming the magnetic gap is relatively lengthily extended in comparison with the conventional art, a number of turns of coil inserted into the magnetic gap is sufficiently increased, and an allowance input of the coil and size of the magnet are increased.

It is still another object of the present invention to provide a vibratory exercise apparatus having low noise and a small amount of wear such as partial wear in components in which a coil connected with a vibration plate is disposed in a magnetic gap in a magnetic circuit using a double Neodymium (Nd) magnet which generates a strong magnetic force, and a vibration plate is supported using a vertical guide and a bobbin guide to enable the coil and the vibration plate to be moved vertically and correctly.

To accomplish the above object of the present invention, according to a first aspect of the present invention, there is provided a vibratory exercise apparatus comprising:

a vertical vibrator including lower and upper magnets which are disposed at a predetermined distance so that mutually magnetic poles oppose each other, for generating a non-alternating magnetic field; a first yoke integrally having a loop-type circulating circuit portion extended from the lower surface of the lower magnet to the upper surface of the upper magnet and an extension portion which is extended perpendicularly upwards at a constant gap from the lower-inner circumferential surface of the lower magnet; a second yoke which connects between the lower and upper magnets and whose inner circumferential surface forms a magnetic gap between the second yoke and the extension portion of the first yoke; a driving coil which generates an alternating magnetic field when an electrical driving signal is applied, and which is disposed in the magnetic gap so as to be displaced up and down according to a mutual action with the non-alternating magnetic field generated from the lower and upper magnets; and a cylindrical bobbin around the cylindrical portion of which the driving coil is wound;

a bobbin guide which is installed at the center of the first yoke;

a bobbin guide rod which is reciprocally movably coupled with the bobbin guide and whose one end is coupled with the upper portion of a bobbin;

a joint whose one end is coupled with the upper portion of the bobbin;

a vibration plate which is coupled with the other end of the joint;

a base on one surface of which the vertical vibrator is installed;

a guide both ends of which are connected with the vibration plate, respectively, and which guides vertical movement of the vibration plate; and a vibration absorption unit which limits a range of movement of the vibration plate when the vibration plate moves vertically, and absorbs impact when the vibration plate descends.

The guide comprises a number of guide bearings which are symmetrically around the vertical vibrator and are installed in the base; and a guide rod which is installed in the vibration plate and coupled with the guide bearings.

The lower and upper magnets are disposed so that N poles oppose each other, respectively, and are formed of a number of divided discs made of Neodymium (Nd).

Also, the vibratory exercise apparatus according to the present invention further comprises: a frame on one side of the lower end of which the base is installed; a display which is installed in the upper end of the frame, for displaying an operational state; an infrared ray generator which is installed in the direction toward the vibration plate, for generating an infrared ray; a load sensor which is installed in the vibration plate, for detecting a load; an object sensor which detects whether or not an object exists on the vibration plate; a manipulator for generating a signal controlling drive of the vertical vibrator; and a controller which drives the vertical vibrator when a driving signal for the vertical vibrator is input via the manipulator and displays a driving state of the vertical vibrator.

The controller stops driving of the vertical vibrator when it is judged that the object disappears from the vibration plate via the object sensor during driving of the vertical vibrator, and detects a load of the object loaded on the vibration plate via the load sensor, and then drives the vertical vibrator into a number of oscillations and a width of vibrations which are appropriate for the detected load.

The joint has a structure of transferring only a force of the vertical direction among the force components of the load applied via the vibration plate to the bobbin.

BRIEF DESCRIPTION OF THE DRAWINGS

The above and other objects and advantages of the present invention will become more apparent by describing the preferred embodiments thereof in detail with reference to the accompanying drawings in which.

DETAILED DESCRIPTION OF THE INVENTION

A vibratory exercise apparatus according to a preferred embodiment of the present invention will be described with reference to the accompanying drawings.

Figure 1:
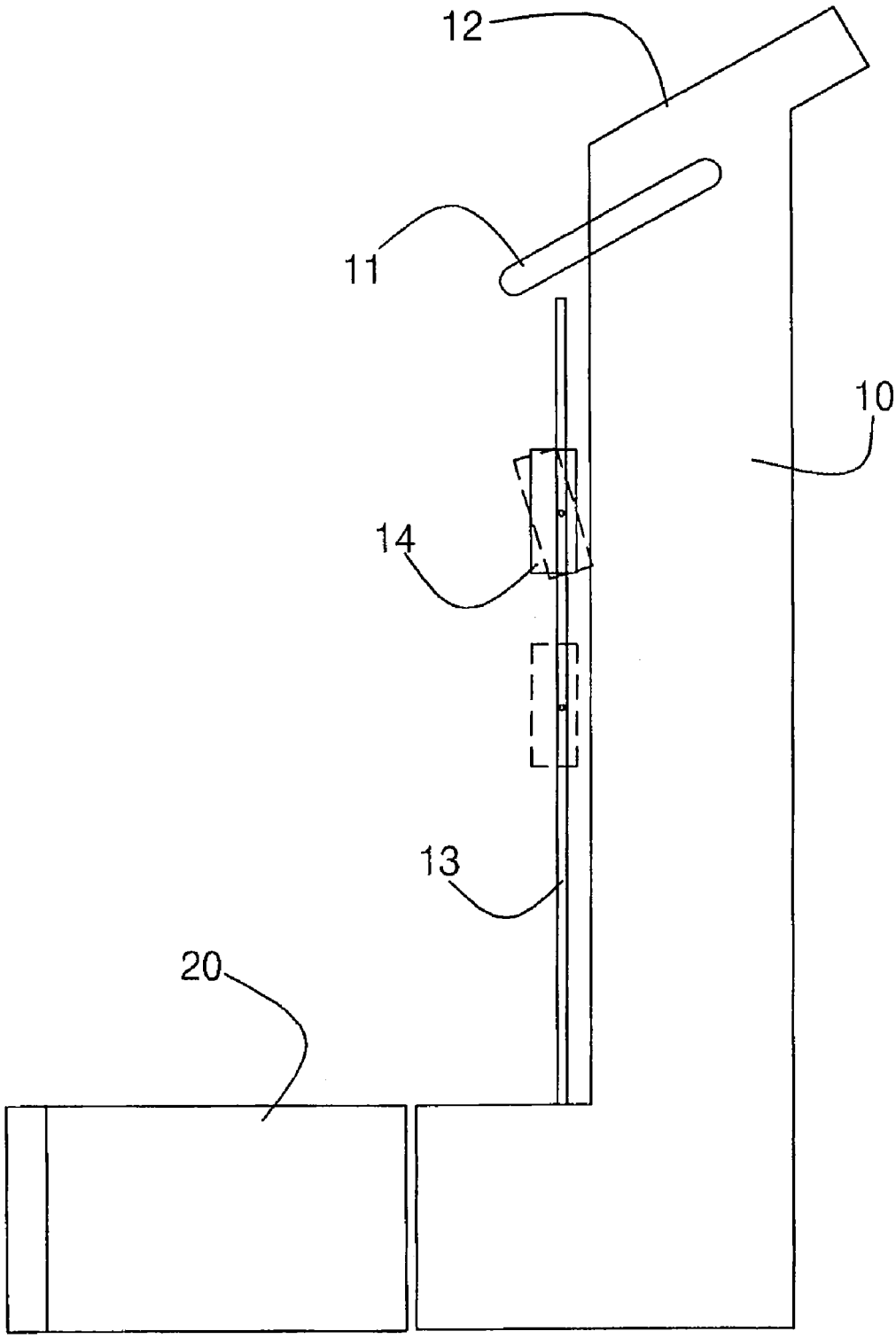
FIG. 1 is a side view for explaining an external appearance of a vibratory exercise apparatus according to the present invention.
Figure 2:
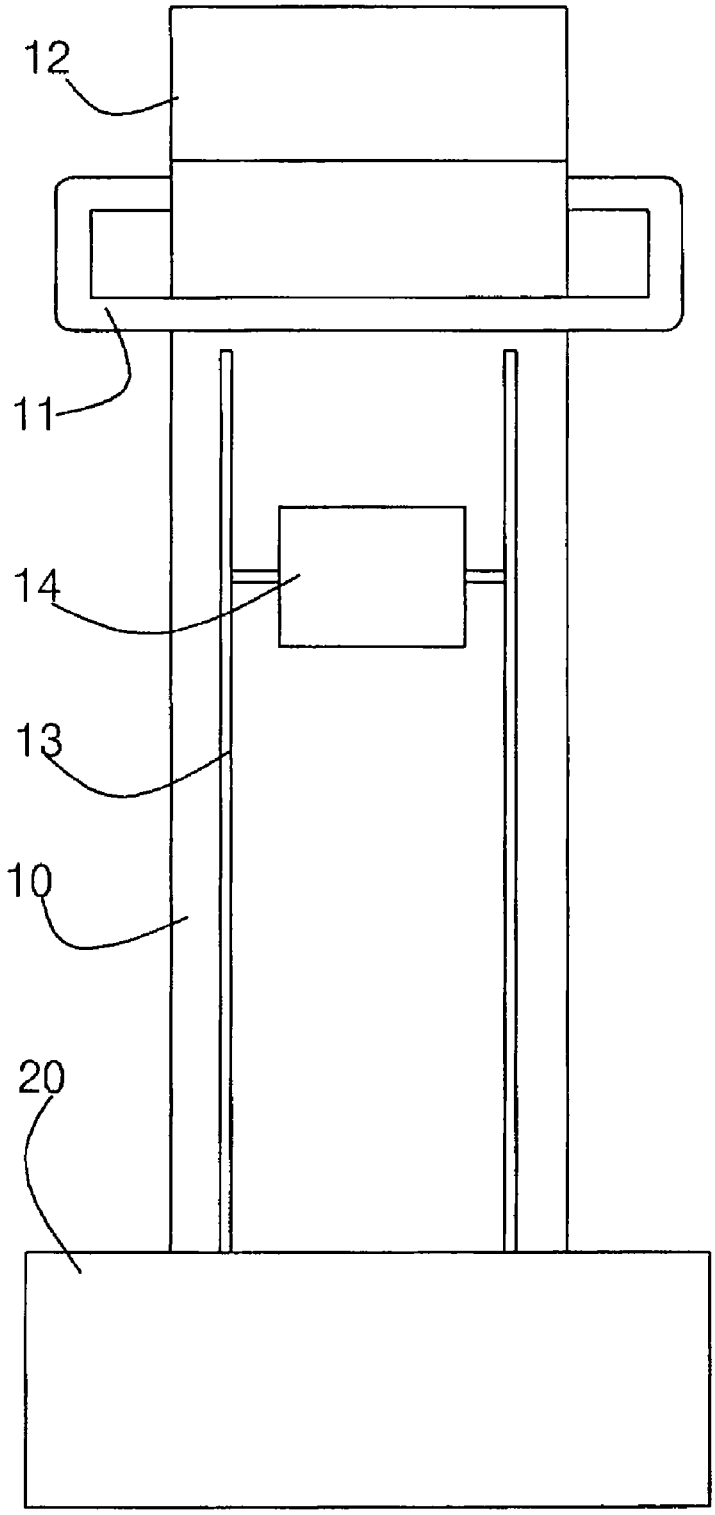
FIG. 2 is a front view of the vibratory exercise apparatus of FIG. 1.

Referring to FIGS. 1 and 2, a vibratory exercise apparatus according to the present invention includes a vibration generator 20 installed in the lower portion of an L-shaped frame 10. A near infrared heater 14 radiating near infrared light is installed in front of the frame 10 by a heater supporter 13.

A handle 11 which helps a user take the hold of it during exercise, and safely use the vibratory exercise apparatus is installed on the upper end of the frame 10. That is, the handle 11 protrudes toward the user to help him or her take the hold of it and exercise. A display 12 displaying a driving status of the vibratory exercise apparatus, and a manipulator (not shown) within which a user establishes a vibration frequency of the vibration generator 20 and manipulates operation of the near infrared heater 14, are installed on the upper surface of the vibratory exercise apparatus.

Among the above-described elements, the near infrared heater 14, the heater supporter 13, the display 12, and the handle 11 are not essential components of accomplishing the object of the present invention, but can be decided whether or not to be installed according to use or object of the invention.

Referring to FIGS. 3A to 5, the vibration generator 30 includes a vertical vibrator 30, a base 21, and a vibration plate 22.

Figure 4:
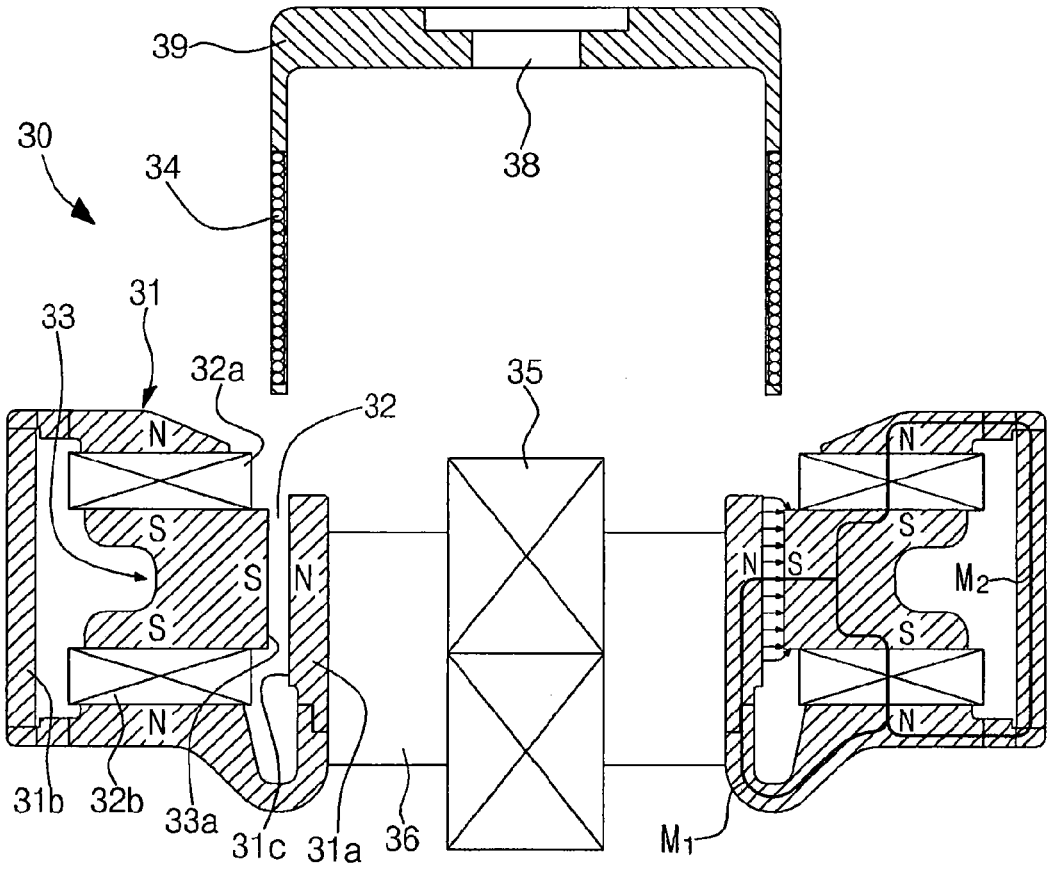
FIG. 4 is an exploded cross-sectional view for explaining a detailed structure of a vertical vibrator in the present invention.
Figure 5:
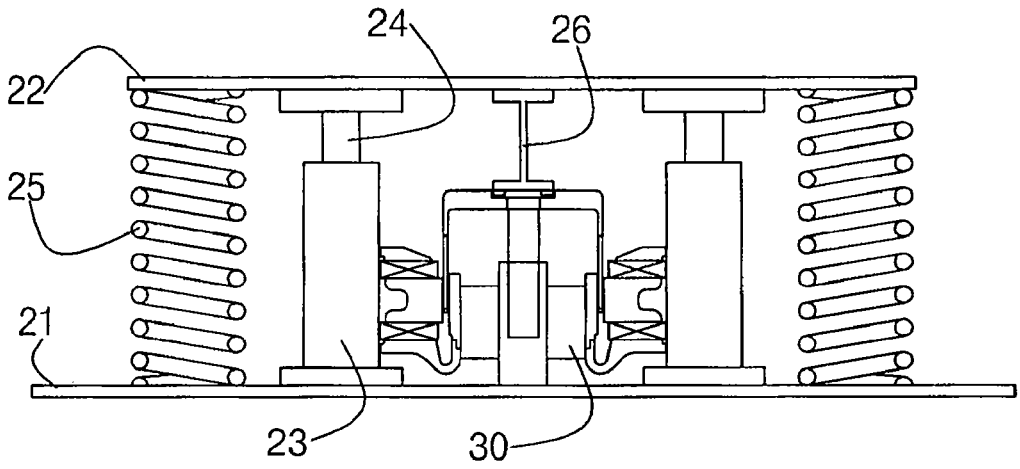
FIG. 5 is a sectional view showing an assembled state of the vibration generating mechanism according to the present invention.

Referring to FIG. 4, the vertical vibrator 30 forms first and second magnetic circuits M1 and M2, using an F-type magnet 32b in which a permanent magnet is located externally in a magnetic circuit and a P-type magnet 32a in which a permanent magnet is located internally in a magnetic circuit. The vertical vibrator 30 has a structure of realizing a uniform distribution of the line of a magnetic force with respect to opposing surfaces of first and second yokes 31 and 33 forming a magnetic gap 32 in the first magnetic circuit M1, preventing a magnetic flux leakage from the magnetic gap 32 by the second magnetic circuit M2 of a loop type including a P-type magnet 32a, and inserting a bobbin 39 where coil 34 is wound in order to drive the vibration plate 22 up and down into the magnetic gap 32 formed in the first magnetic circuit M1.

The F-type magnet 32b and the P-type magnet 32a which provide the magnetic forces for the first and second magnetic circuits M1 and M2, respectively use Neodymium (Nd) having a magnetic flux density more than eleven point five times as that of an existing ferrite magnetic material. Here, the Neodymium (Nd) magnetic material is formed into a disc-shaped divided pieces, and then strongly magnetized in a direct magnetization method, in order to make permanent magnets which are used as F-type and P-type magnets 32b and 32a.

Thus, since the present invention uses a previously directly magnetized Neodymium (Nd) magnet having a strong magnetic force, an inexpensive direct magnetization facility can be used instead of an expensive magnetization facility of an indirect magnetization method, to thus reduce the facility investment cost. Also, magnetization time can be shortened by using a direct magnetization method.

Also, when magnets are assembled, a number of divided pieces are fixed to yokes 31 by an adhesive. Accordingly, a problem of attracting other components due to a strong attraction force or a strong repulsive force in the case that magnets of identical polarities are assembled does not occur when the magnets are assembled into a single annular magnet.

Further, it is of course possible to use magnets in which an annular ferrite magnets or other magnetic materials are used and assembled as the magnets 32a and 32b, and then magnetized.

The first magnetic circuit M1 includes the F-type magnet 32b, an extension portion 31a which is extended upwards in the form of a pole piece at a certain distance from the inner circumference of the outer side of the first yoke 31 which is disposed in the lower portion of the F-type magnet 32b, and the second yoke 33 which is disposed in the upper portion of the F-type magnet 32b, and forms a magnetic gap 32 between the opposing surface of the pole-piece shaped extension portion 31a and the second yoke 33. The second magnetic circuit M2 includes the second yoke 33, the P-type magnet 32a which is disposed in the upper surface of the second yoke 33 with an identical polarity (for example, an S pole) to that of the F-type magnet 32b, and a loop shaped circulation circuit portion 31b which is extended from the upper end of the P-type magnet 32a to the lower end of the F-type magnet 32a.

The loop shaped circulation circuit portion 31b forms the first yoke 31 integrally with the extension portion 31a. Also, the second yoke 33 is linearly branched off respectively to the upper surface of the F-type magnet 32b and the lower surface of the P-type magnet 32a from the opposing surface 33a forming the magnetic gap 32, and is symmetrically extended, to thereby provide a path of lines of magnetic force.

As a result, since the P-type and F-type magnets 32a and 32b of identical dimensions and polarities are symmetrically disposed in the upper and lower portions of the second yoke 33 in the case of the first and second magnetic circuits M1 and M2, respectively, lines of magnetic force generated from the extension portion 31a in the first yoke 31 do not lean to any one side of the upper and lower portions of the second yoke 33, and are fed back to the P-type and F-type magnets 32a and 32b via the second yoke 33. Accordingly, uniform distribution of lines of magnetic force is realized on the opposing surfaces of the yokes 31 and 33, in the magnetic gap 32 into which the coil 34 is inserted, and thus a linear response characteristic of a vibration system, that is, straightforwardness of a voice coil is improved, to thereby reduce a minute frequency distortion phenomenon.

Also, since the inner portion of the second yoke 33 forming an S pole is surrounded by the circulation circuit portion 31b of the first yoke 31 forming an N pole, and the P-type and F-type magnets 32a and 32b, a magnetic flux leakage phenomenon is suppressed and a driving force is reinforced with respect to a vibration system, to thereby increase a magnetic efficiency.

The bobbin 39 around which a coil 34 is wound is inserted into the magnetic gap 32 in the first magnetic circuit M1. The bobbin 39 is connected with the vibration plate 22 via the joint 26.

Also, a bobbin guide 35 made of a vertical bearing is installed at the center of the inner extension portion 31a of the first yoke 31. One end of a bobbin guide rod 27 coupled with the bobbin guide 35 is fixed to one end of the joint 26, together with the central portion 38 of the bobbin 39.

Meanwhile, a heat radiation pipe 36 of an excellent heat conductivity, for example, an aluminum (Al) material is inserted into the inner portion of the first yoke 31, in order to quickly discharge out heat generated from the coil 34, the magnets P-type and F-type magnets 32a and 32b, and the yoke 31, in an air cooling method. Thus, the bobbin guide 35 is finally installed at the center of the heat radiation pipe 36.

The heat radiation pipe 36 plays a role of supporting the bobbin guide 35, minimizing a magnetic force applied from the extension portion 31a in the first yoke 31 forming an N pole to the inner bobbin guide 35 and inducing lines of magnetic force to be concentrated toward the magnetic gap 32, in addition to a heat radiation function.

Also, the bobbin 39 is fabricated thick at the central portion 38 with which the upper end of the bobbin guide rod 27 is coupled, and thin at the cylindrical portion around which the coil 34 is wound considering the interval of the magnetic gap 32, by means of an injection molding method of a plastic material. A portion around which the coil 34 is wound can be formed of a recessed groove. In this case, the wound coil 34 is made of a four-layered structure in order to increase an allowable input.

Also, the bobbin 39 can be made of a non-magnetic metallic material such as aluminium or brass.

Since the bobbin guide 35 is provided in the present invention, the bobbin 35 is guided so that linear movement of the vertical direction is performed without left and right partial wear even in the case that a large input is applied to the coil 34 and thus the vibration plate 22 is greatly vibrated up and down.

In the present invention, the magnetic gap opposing surfaces 31c and 33a in the first and second yokes 31 and 33 are inserted into the magnetic gap 32 and are preferably lengthily formed to sufficiently cover a vibration range of the voice coil 34 so that a magnetic force is efficiently applied to the coil 34 which vibrates up and down.

The above-described vertical vibrator 30 is installed between the base 21 and the vibration plate 22, and a number of guides 23 made of vertical bearings are installed in the base 21 located near the vertical vibrator 30, in order to heighten a vertical movement capability of the vibration plate 22. Also, guide rods 24 which are respectively coupled with the guides 23 are fixed to the lower surface of the vibration plate 22.

Figure 3A:
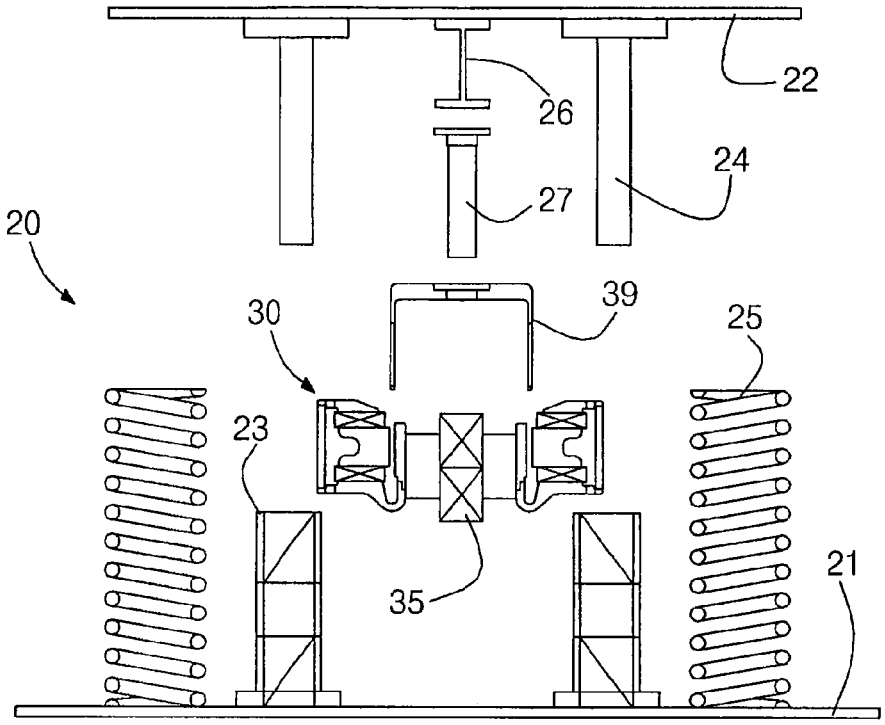
FIGS. 3A and 3B are an exploded sectional view and a plan view schematically showing structure of a vibration generating mechanism in the present invention, respectively.
Figure 3B:
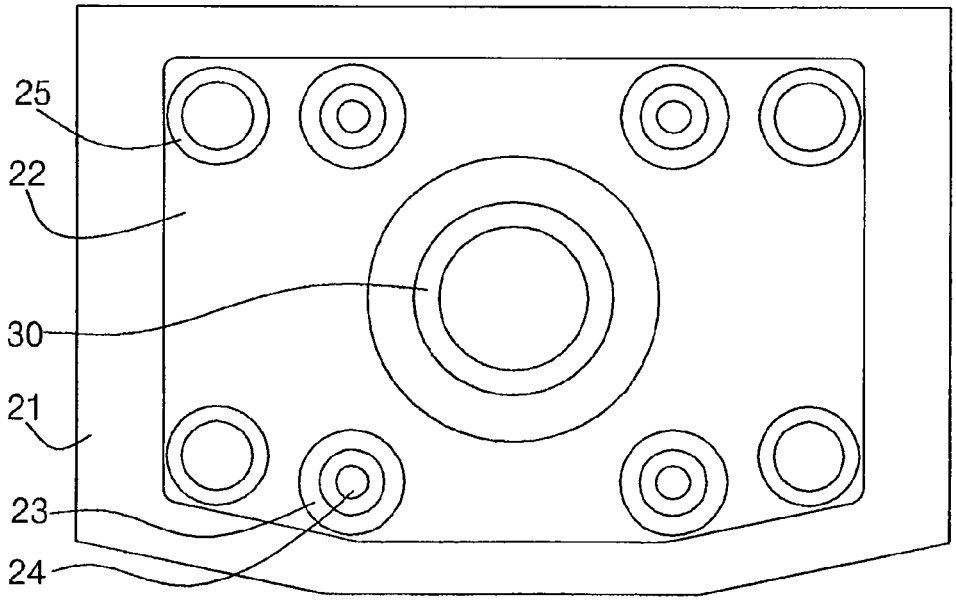

Also, in order to mitigate impact applied to the vertical vibrator 30 via the vibration plate 22, a number of springs 25 are symmetrically spread out as shown in FIGS. 3A and 3B, so that both ends of the springs 25 are fixed to the upper surface of the base 21 and the lower surface of the vibration plate 22.

The joint 26 is connected between the vibration plate 22 and the bobbin 39, and plays a role of transferring an up-and-down vibration generated by the bobbin 39 to the vibration plate 22. The joint should meet the following conditions: since the joint 26 transfers vertical movement, it should have a column structure in which it should accommodate displacement such as rotation and movement as much as a clearance of the bobbin guide 35. Since the clearance is not more than 1 mm, a column, having a minimum area that does not lead to a buckling phenomenon, is erected in order to transfer forces. Accordingly, the above described condition can be met.

As described above, since the joint 26 of the simple structure can be used, a production cost is minimized, noise is not generated, and durability thereof is heightened. It is preferable to use elastic elements such as springs in order to suppress a buckling phenomenon. Here, the buckling means that a thin vertical element is collapsed in the case that it is compressed.

Figure 6:
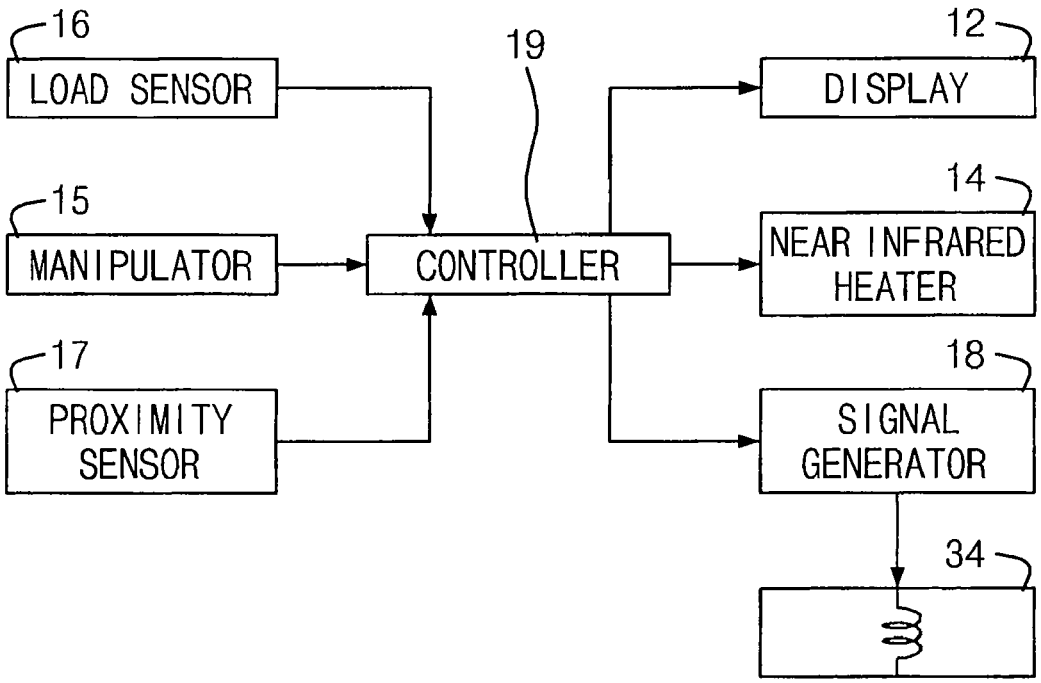
FIG. 6 is a block diagram schematically showing a configuration of a control system employed in the vibratory exercise apparatus according to the present invention.

Meanwhile, the vibratory exercise apparatus includes a control system for controlling the exercise apparatus as shown in FIG. 6. The control system includes a controller 19 which integrally includes a program memory storing a control program, a RAM (Random Access Memory) temporarily storing data during signal processing, and a signal converter which performs an analog-to-digital (A/D) conversion and a digital-to-analog (D/A) conversion of an input and output signal.

The control system includes a load sensor 16 measuring a user's weight, and a proximity sensor 17 which is a kind of an object sensor, in order to confirm whether or not an object approaches, that is, whether a user is located on the vibration generator 20 in the vibratory exercise apparatus, in which the load sensor 16 and the proximity sensor 17 are installed in the vibration generator 20. The outputs from the load sensor 16 and the proximity sensor 17 are connected with the controller 19.

Also, to the input of the controller 19 is connected a manipulator 15 which enables a user to set a system operation, that is, a mode selection for selecting one of an automatic mode or a manual mode for the system operation, a frequency of a driving signal applied to the coil 34 in the vertical vibrator 30, that is, the number of vibrations of the vibration plate 22, an operating time, and an on/off operation of the near infrared heater 14. Also, to the output of the controller 19 are connected a display 12 displaying an operational state of the system for a user's view, the near infrared heater 14, and a signal generator 18 which generates and amplifies a driving signal applied to the coil 34. It is preferable that the manipulator 15 is generally installed near the display 12.

If a user stands on the vibration plate 22 in the vibration generator 20 and sets a vibration frequency of a driving signal applied to the coil 34 to be a value of a range between 3 Hz and 50 Hz at a manual mode via the manipulator 15, the controller 19 applies a control signal corresponding to a frequency set value to the signal generator 18. Accordingly, the signal generator 18 generates a sinusoidal signal having a frequency of a range between 3 Hz and 50 Hz, in particular, any one frequency in a range between 10 Hz and 20 Hz in the case of an aerobic exercise, according to a user's set value, and then voltage-amplifies and power-amplifies the sinusoidal signal to then be applied to the coil 34.

Meanwhile, if a user selects an automatic mode in the manipulator 15, the controller 19 detects a user's weight via the load sensor 16 and calculates the optimal number of vibrations and an optimal vibration width, that is, an optimal vibration intensity according to the weight measured according to a system control program which is previously set in the program memory. Accordingly, the signal generator 18 is controlled by the optimal number of vibrations and the optimal vibration width, that is, the optimal vibration intensity, to thereby control the frequency and intensity of the driving signal to be applied to the coil 34 according to the user's weight.

As described above, the controller 19 can be used in order to control the signal generator 18 and prevent the knee articulation of an overweight user from being damaged due to the excessive number of vibrations and the excessive vibration width.

Also, the control system according to the present invention can use an audio signal as a driving signal to be applied to the coil 34. That is, it is possible that a low-frequency signal of 20 Hz or less which is difficult to be reproduced by a speaker is separated by use of a low-pass filter, to then make the coil 34 in the vibration generator 20 operate with the low-frequency signal. In this case, since the vibration plate 22 in the vibration generator 20 is vibrated in correspondence to the audio signal, a user enjoys an audio sound reproduced via a general speaker with his or her ears and feels vibrations corresponding to the audio signal with his or her body.

As described above, the vibration generator 20 in the present invention provides a sufficient vertical driving force by driving the vibration plate 22 connected with the bobbin/coil up and down, by the magnetic circuits M1 and M2 using permanent magnets of a high permeability which can generate a strong magnetic force. Also, the vibratory generator 20 in the present invention improves a linear response characteristic of a vibration system by realizing a uniform distribution of the line of a magnetic force on the yoke opposing surfaces 31c and 33a forming the magnetic gap 32, and suppresses a magnetic flux leakage phenomenon, to thereby enhance a conversion efficiency. Also, since the vibratory generator 20 in the present invention employs the magnetic circuits M1 and M2 of the excellent low-frequency characteristic by lowering a frequency distortion phenomenon, an accurate vertical movement is accomplished even in the case that the vibration generator 20 operates at a low frequency of 20 Hz or less.

Since the vibration generator 20 in the present invention makes the vibration plate vertically vibrate by an electromagnetic method using a magnetic gap, it does not give a burden to the articulation of the human body and causes little noise and little wear of components. Also, the vibration generator 20 in the present invention vibrates the whole human body vertically through the vertical vibration of the vibration plate, the muscles are exercised through repeated contraction and relaxation of the muscles. As a result, strengthening of the muscles is accomplished, and an effect of exercising the whole body is provided in which the muscles consume a more amount of calories than a general aerobic exercise.

Meanwhile, the control system in the present invention confirms whether or not a user uses the vibratory exercise apparatus based on the input signals received from the load sensor 16 and the proximity sensor 17, and then makes the vertical vibrator 30 stop immediately even in the case that a user goes down from the vibratory exercise apparatus without stopping operation thereof, during using the vibration generator 20. As a result, it is possible to prevent power consumption and avoid a possible accident.

As described above, the present invention provides a vibratory exercise apparatus of a magnetic gap type which realizes a uniform distribution of the line of a magnetic force and a lengthy magnetic gap structure, with respect to the opposing surfaces of yokes forming a magnetic gap, and realizes a high power magnetic circuit of an excellent linear response characteristic of a vibration system by an increase in an allowable input and an increase in the size of magnets.

As a result, the present invention generates vertical vibration with respect to a vibration plate by a magnetic gap method, to thereby remove a cause of impact during operating and to thus reduce noise generation and mitigate impact to be applied to the articulation of a user.

Also, the magnetic circuit employed in the present invention constitutes a double magnetic circuit using Neodymium magnets as P-type and F-type magnets, to thereby increase a magnetic flux density in a magnetic gap and suppress generation of a leaking magnetic flux in the magnetic gap, in order to realize a high efficiency vibratory exercise apparatus.

As described above, the preferable embodiments of the present invention have been described with reference to the accompanying drawings. However, the present invention is not limited to the above-described embodiments. It is apparent to one who has an ordinary skill in the art that there may be many modifications and variations within the same technical spirit of the invention.

What is claimed is:

1. A vibratory exercise apparatus comprising:

a vertical vibrator including lower and upper magnets which are disposed at a predetermined distance so that mutually magnetic poles oppose each other, for generating a non-alternating magnetic field;

a first yoke integrally having a loop-type circulating circuit portion extended from a lower surface of the lower magnet to an upper surface of the upper magnet and an extension portion which is extended perpendicularly upwards at a constant gap from the lower-inner circumferential surface of the lower magnet;

a second yoke which connects between the lower and upper magnets and whose inner circumferential surface forms a magnetic gap between the second yoke and the extension portion of the first yoke;

a driving coil which generates an alternating magnetic field when an electrical driving signal is applied, and that is disposed in the magnetic gap so as to be displaced up and down according to a mutual action with the non-alternating magnetic field generated from the lower and upper magnets;

and a cylindrical bobbin around the cylindrical portion of which the driving coil is wound;

a joint whose one end is coupled with the upper portion of the bobbin;

a vibration plate which is coupled with the other end of the joint;

a base on one surface of which the vertical vibrator is installed;

a guide, both ends of which are connected with the vibration plate, respectively, and which guides vertical movement of the vibration plate; and a vibration absorption unit which limits a range of movement of the vibration plate when the vibration plate moves vertically, and absorbs impact when the vibration plate descends.

2. The vibratory exercise apparatus according to claim 1, further comprising: a bobbin guide which is installed at the center of the first yoke; and a bobbin guide rod which is reciprocally movably coupled with the bobbin guide and whose one end is coupled with the upper portion of a bobbin.

3. The vibratory exercise apparatus according to claim 1, wherein the guide comprises a number of guide bearings which are installed in the base; and a guide rod whose one end is installed in the vibration plate and whose other end is coupled with the guide bearings.

4. The vibratory exercise apparatus according to claim 1, wherein the lower and upper magnets are disposed so that N poles oppose each other, respectively, and are formed of a number of divided discs made of Neodymium (Nd).

5. The vibratory exercise apparatus according to claim 1, further comprising: a manipulator for setting an operational condition of the vertical vibrator;

a signal generator for generating a driving signal for the coil of the vertical vibrator; and a controller which drives the signal generator according to the operational condition set via the manipulator, and displays a driving state of the signal generator on a display.

6. The vibratory exercise apparatus according to claim 5, further comprising: an object sensor which detects whether or not an object exists on the vibration plate, wherein the controller stops driving of the vertical vibrator if it determines that the object disappears from the vibration plate via the object sensor during driving of the vertical vibrator.

7. The vibratory exercise apparatus according to claim 5, further comprising: a load sensor which is installed in the vibration plate, for detecting a load, wherein the controller detects the weight of the object loaded on the vibration plate via the load sensor, to thereby drive the vertical vibrator with the number of vibrations and a vibration width appropriate for the detected load.

8. The vibratory exercise apparatus according to claim 1, further comprising: a frame on one side of the lower end of which the base is installed.

9. The vibratory exercise apparatus according to claim 8, further comprising: a display which is installed in the upper end of the frame, for displaying an operational state.

10. The vibratory exercise apparatus according to claim 8, further comprising: an infrared ray generator which is installed in the direction toward the vibration plate, for generating an infrared ray.

11. The vibratory exercise apparatus according to claim 1, wherein the joint has a structure of transferring only a force of the vertical direction among the force components of the load applied via the vibration plate to the bobbin.

12. The vibratory exercise apparatus according to claim 2, wherein the guide comprises a number of guide units which are positioned symmetrically around the vertical vibrator.

13. The vibratory exercise apparatus according to claim 2, further comprising a heat radiation pipe which is installed between the bobbin guide and the extension portion of the first yoke and which discharges heat generated by the coil, the upper and lower magnets, and the first and second yokes by an air cooling method.

14. The vibratory exercise apparatus according to claim 2, wherein the lower and upper magnets are disposed so that N poles oppose each other, respectively, the second yoke forms an S pole, the first yoke forms an N pole, and the second yoke is surrounded by the loop type circulation circuit portion of the first yoke and the lower magnet and the upper magnet so that leakage of the magnetic flux is suppressed from the second yoke.

*15. A vibrator comprising:*

*an upper magnet;*

*a lower magnet located below the upper magnet and positioned so that a magnetic pole of the upper magnet and a magnetic pole of the lower magnet face each other and have the same polarity relative to one another;*

*a first member extending from a bottom surface of the upper magnet to a top surface of the lower magnet, the first member comprising a first surface;*

*a second member extending from a bottom surface of the lower magnet upward along the first surface of the first member and comprising a second surface, the second surface facing the first surface, extending substantially parallel to the first surface, and forming a gap between the first surface and the second surface; and*

*circuitry disposed in the gap and configured to change a position of the circuitry within the gap when conducting an alternating electrical current.*

*16. The vibrator of claim 15 wherein the first member comprises a first yoke and the second member comprises a second yoke.*

*17. The vibrator of claim 15 wherein the circuitry comprises a coil.*

*18. The vibrator of claim 15 further comprising a third member extending from the bottom surface of the lower magnet to the top surface of the upper magnet and extending adjacent to a third surface of the first member, the third surface of the first member opposing the first surface of the first member.*

*19. The vibrator of claim 18 wherein the third member is configured to channel magnetic flux from the upper magnet to the second member and the second member is configured to channel magnetic flux from the third member to the gap and from the lower magnet to the gap.*

*20. The vibrator of claim 18 wherein the third member circumscribes the first member.*

*21. The vibrator of claim 15 wherein the second member is configured to channel magnetic flux from the lower magnet to the gap.*

*22. The vibrator of claim 15 wherein the gap, upper magnet, lower magnet, first member, and second member are annular.*

*23. The vibrator of claim 22 wherein the circuitry comprises a coil and wherein the gap, upper magnet, lower magnet, first member, second member, and coil are coaxial and the upper magnet, lower magnet, and first member circumscribe the coil.*

*24. The vibrator of claim 15 wherein the first surface is perpendicular to the bottom surface of the upper magnet and to the top surface of the lower magnet.*

*25. The vibrator of claim 15 wherein the circuitry comprises a coil and the first surface is positioned outside of the coil and the second member is positioned inside the coil.*

*26. The vibrator of claim 15 wherein the second member extends along an entirety of the first surface and extends along at least a portion of a lateral surface of the upper magnet.*

*27. A vibrator comprising:*

*a magnetic circuit comprising:*

*a first magnet comprising a first pole and a second pole, the first and second poles having opposite polarities relative to one another;*

*a second magnet comprising a first pole and a second pole, the first and second poles having opposite polarities relative to one another;*

*a first member coupling the first pole of the first magnet and the first pole of the second magnet;*

*a second member coupling the second pole of the first magnet and the second pole of the second magnet; and*

*a third member coupled to the first pole of the first magnet and positioned to form a gap between the third member and the second member; and*

*circuitry disposed in the gap and configured to change a position of the circuitry within the gap when conducting an alternating electrical current.*

*28. The vibrator of claim 27 wherein the first pole of the first magnet and the first pole of the second magnet are not coupled together by the third member.*

*29. The vibrator of claim 27 wherein the upper magnet comprises a P-type magnet, the lower magnet comprises an F-type magnet, and the magnetic pole of the upper magnet and the magnetic pole of the lower magnet are both south poles.*

*30. The vibrator of claim 27 wherein a magnetic moment of the upper magnet and a magnetic moment of the lower magnet have substantially the same magnitude.*

* * * * *